Jan. 15, 1963 K. W. MILLER 3,073,922
ACCELERATION DEVICES AND INDICATING APPARATUS
Original Filed Nov. 8, 1954 2 Sheets-Sheet 1

INVENTOR.
KENNETH W. MILLER
BY
Kenneth W. Miller

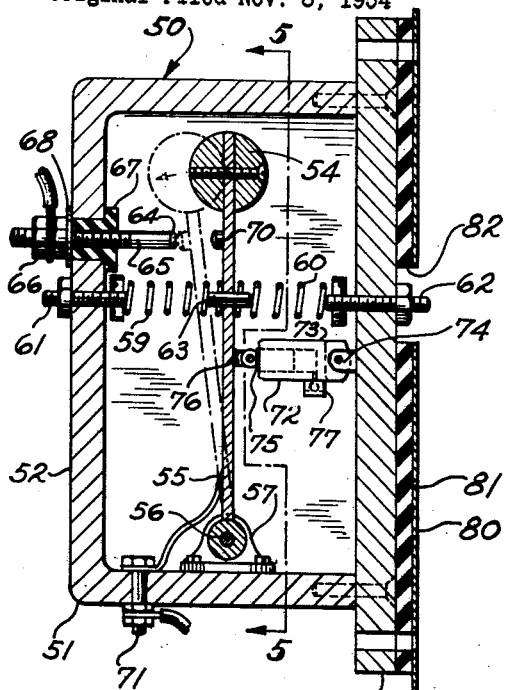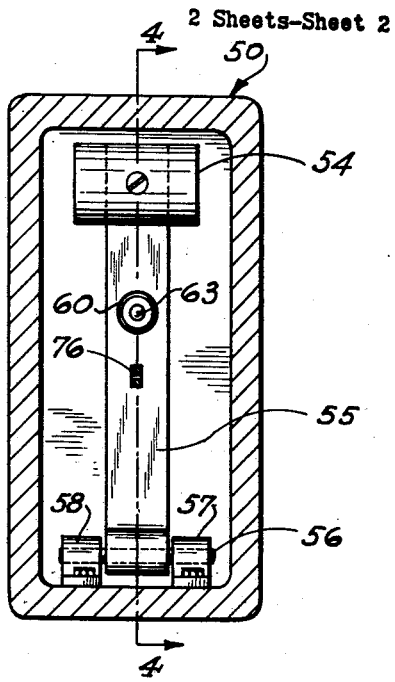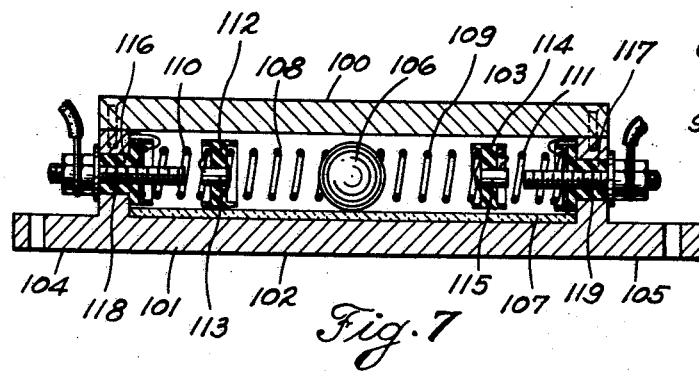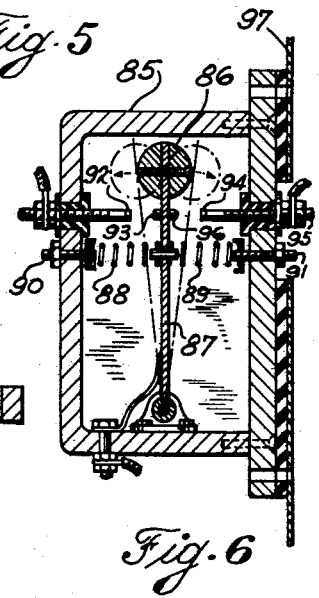
Jan. 15, 1963    K. W. MILLER    3,073,922
ACCELERATION DEVICES AND INDICATING APPARATUS
Original Filed Nov. 8, 1954    2 Sheets-Sheet 2
Fig. 4
Fig. 5
Fig. 7
Fig. 6
INVENTOR.
KENNETH W. MILLER
BY
Kenneth W. Miller United States Patent Office 3,073,922
Patented Jan. 15, 1963

1

3,073,922
ACCELERATION DEVICES AND INDICATING
APPARATUS
Kenneth W. Miller, 474 Overlook Road, Mansfield, Ohio
Continuation of application Ser. No. 467,411, Nov. 8,
1954. This application Aug. 7, 1959, Ser. No. 832,888
10 Claims. (Cl. 200—61.48)

This invention relates to acceleration devices and indicating apparatus therefor and, more particularly, to a device for signalling changes in the speed of an automotive vehicle to the driver of a following vehicle.

This application incorporates matter originally disclosed and claimed in my application Serial Number 467,411, filed filed November 8, 1954, now abandoned, and entitled "Signalling Apparatus for Vehicles" and is a continuation of that application.

An object of the invention is to provide an indication of changes in the speed of an automotive vehicle and one which provides such indication without the intervention of a human operator. It is a further object of the invention to indicate directly by means of a warning signal when the speed of a vehicle starts to increase or decrease.

In the operation of automotive vehicles under crowded traffic conditions great numbers of accidents result because of the fact that when the operator of a vehicle which is traveling at a moderate speed changes his course, as by suddenly reducing his speed, the driver of a closely following vehicle has insufficient time to detect the change in speed and take proper measures to alter his course and avoid a collision with the rear of the leading vehicle. A large part of the difficulty is due to the fact that the nature of the sense organs which detect the changes in the speed of the leading vehicle are responsive only to substantial changes and, secondly, because the fact that a finite period must elapse between the time that the driver of the following vehicle detects the change in course of the leading vehicle and the time he takes action to alter or modify the course of his own vehicle.

Accordingly, I have devised an apparatus for indicating directly to the driver of a following vehicle the changes in speed of a leading vehicle. An inertia switch is mounted on the automobile and is connected to a signal device comprising a red light at the rear of the vehicle. When the driver of the leading vehicle applies his brakes or otherwise decelerates the vehicle the inertia switch is operated to close the circuit to the signal light and cause an indication to the driver of the following vehicle. The device can be made sensitive to relatively small changes in speed so that the driver of the following vehicle has almost instantaneous warning of modifications in the course of the leading vehicle and thus has ample time to take action to avert a collision.

The features of the invention are pointed out with particularity in the appended claims. The invention together with the objects and advantages thereof may be better understood by reference to the following detailed description taken in connection with the accompanying drawings, in which:

FIG. 4 is a vertical sectional view of an inertia switch particularly adapted for use in the present invention;

FIG. 5 is a sectional view of the inertia switch taken in a direction 5—5 of FIG. 4;

FIG. 6 is a vertical sectional view of an inertia switch similar to that of FIG. 4 but is modified to be operative in two directions; and FIG. 7 is a vertical sectional view of another form of inertia switch adapted to be used particularly with the signalling device of FIG. 3.

Figure 1:
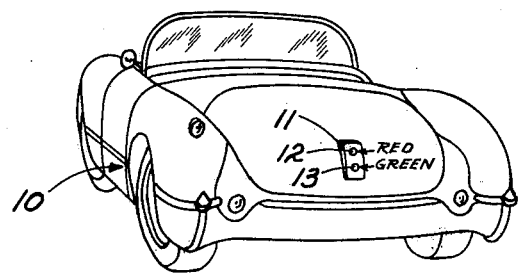
FIG. 1 is a modified perspective view of an automotive vehicle carrying the signalling device of the invention.

Referring now to FIG. 1, the automobile 10 carries an indicating device 11 at the rear thereof for displaying a red or green light as the speed of the vehicle is increased or decreased, respectively. The lights 12 and 13 are normally in an unenergized condition and are energized to provide a warning signal only at the time that the speed of the vehicle is changed. Thus if the driver of the vehicle 10 is driving at 35 m.p.h. and applies the brake or simply decelerates to 25 m.p.h., the red light 12 will be energized to provide a warning indication during the period of deceleration. When the driver resumes speed at 25 m.p.h. the light 12 is extinguished. Conversely, if the driver of the vehicle increases speed from 25 m.p.h. to 35 m.p.h., the green light 13 is lighted during the period of acceleration and is extinguished when the driver resumes speed at 35 m.p.h.

Figure 2:
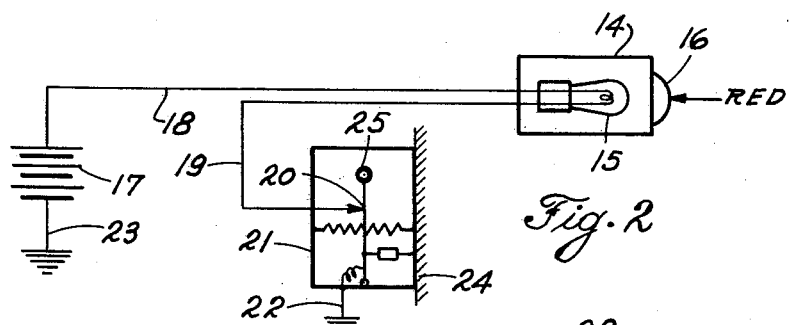
FIG. 2 is a schematic diagram of the signalling device of the invention.

Referring now to FIG. 2, the signalling device of the invention comprises an indicator 14 having a lamp 15 and a lens 16 for displaying the light from the lamp 15. The lamp 15 is energized from a battery 17, which may be the usual storage battery of the automobile, and is connected in a series circuit which includes the leads 18 and 19, the contact 20 of the inertia switch 21, and the ground connections 22 and 23. The inertia switch 21 is shown as mounted on the bulkhead 24 of the vehicle 10 and at the forward side thereof and is arranged so that when the vehicle is decelerated a mass member 25 is carried forward to close the contact 20 and energize the lamp 15. The illustration of the inertia switch 21 in FIG. 2 is intended to be schematic only and the construction and operation of the switch will be fully set forth in connection with FIGS. 4 and 5, inclusive.

The embodiment of FIG. 2 is a simplified or basic circuit which is useful only for detecting and indicating changes of speed in one direction. Thus the lamp 15 is energized only when the vehicle is decelerated although, of course, by reversing the position of the switch 21 the device may be made to energize the lamp 15 only when the vehicle is accelerated.

Figure 3:
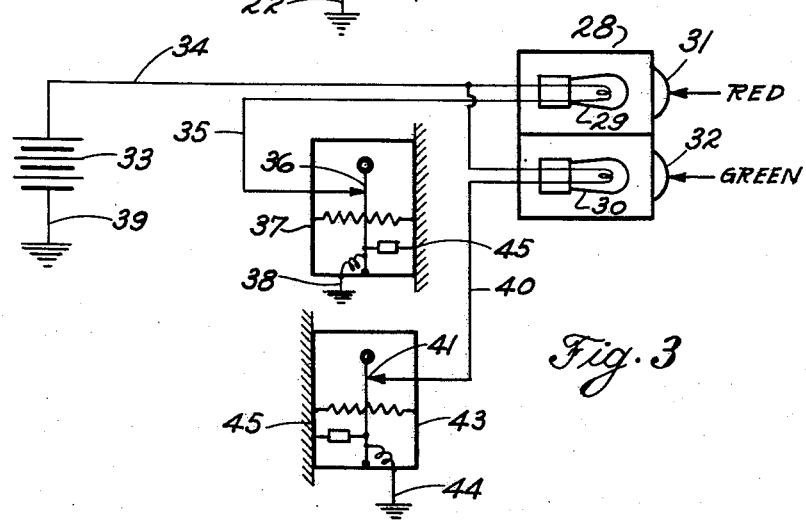
FIG. 3 is a schematic diagram of a second embodiment of the invention.

The embodiment of FIG. 3 corresponds to that shown in FIG. 1 and incorporates an indicator 28 having signal lamps 29 and 30 and signal lenses 31 and 32 of red and green, respectively. The lamps 29 and 30 are energized from a battery 33 which is connected in two series circuits, the first including the lead 34, lamp 29, lead 35, contact 36 of inertia switch 37, and ground connections 38 and 39, and the second including the lead 34, lamp 30, lead 40, contact 41 of intertia switch 42 and ground leads 44 and 39, respectively. The inertia switch 37 is mounted forward of the bulkhead 45 and is operated during intervals of deceleration to close the contact 36 and energize the lamp 29 in the same fashion as the embodiment of FIG. 2. The inertia switch 43 is mounted toward the rear of the bulkhead 45 so that the contacts 41 are closed to energize the lamp 30 during intervals when the vehicle is accelerated.

Referring now to FIGS. 4 and 5, there is shown a sectional view of an inertia switch 50 such as the switch 21 of FIG. 2 and the switches 37 and 43 of FIG. 3. The switch 50 includes a housing 51 in two parts including a hollow, generally rectangular member 52 and a cover 53. The members are relatively massive to insure that the relation between the various parts of the switch is maintained and may, for example, be made of cast aluminum. The switch 50 includes an inertia member 54 formed by clamping two semi-cylindrical pieces together and to a rigid member 55 which is pivoted at the lower end on a shaft 56. The shaft 56 is carried by two bearings 57 and 58 to permit the members 54 and 55 to swing in the manner of an inverted pendulum.

The pivot member 55 is held by two springs 59 and 60 which engage the member 55 at the inner ends thereof and are supported at the outer ends by two adjusting screws 61 and 62. The springs 59 and 60 are positioned at the inner end by a pin 63. The adjusting screws 61 and 62 are threaded in the housing members 52 and 53, respectively, and may be adjusted to impart the desired compression to the springs 59 and 60.

The first contact 64 for the switch 50 is carried upon and supported by a bolt 65 which extends through the housing member 52 and forms a terminal 66 at the outer end thereof. The bolt 65 is insulated from the housing member 52 by means of an insulating bushing 67 and an insulating washer 68. A second contact 70 of the switch 50 is carried by the pivot member 55 toward the upper end thereof and is adapted to engage the contact 64 when the member 54 is moved to the displaced position shown in dotted outline. The bolt 65 is threaded in the member 67 so that the lateral position of the contact 64 may be adjusted for varying operating conditions or design of the switch. The contact 70 is connected to the ground terminal 71 at the bottom end of the member 55.

The pivoted member 75 is constrained by a dashpot 72 which is secured at one end thereof to the housing member 53 and at the remaining end to the member 55 below the spring 60. The cylinder 73 of the dashpot 72 is pivoted on a member 74 which is attached to the housing member 53 while the piston 75 is pivoted on a member 76 which is attached to the member 55. The dashpot 72 includes a check valve 77 on the underside of the cylinder 73 in communication with the inner end of the cylinder opening. The check valve 77 includes a check ball which is formed of relatively light material such as nylon so that air may be admitted to the cylinder opening relatively freely when the pivot member 55 moves to the left. However, when the forces due to the decelerating movement are terminated, the return of the member 55 to the neutral position under the influence of the spring 59 is opposed by the dashpot 72.

With this arrangement the contacts 64 and 70 are maintained in engagement for a definite interval because of the opposition of the dashpot 72 to movement of the member 55 away from the member 65. Again, the dashpot 72 is effective to prevent over shoot of the system including the member 54, the pivot member 55, and the springs 59 and 60, when the decelerating forces cease. Oscillating movement of the system is inhibited and false indications, by reason of engagement of the contact 70 with the contact 64 during violent swings of the member 55, are prevented. It is important that this effect is achieved with a minimum of resistance to movement of the member 55 in the direction of the fixed member 65 under the influence of forces due to decelerating movement of the vehicle 10.

In practicing the principal invention the inertia switch 50 is secured to some rigid part of the body or frame of the automotive vehicle. As shown in FIG. 4, the inertia switch 50 is mounted on the bulkhead 80 and is preferably separated from the bulkhead by a sheet 81 of rubber or similar material so as to insulate the switch from the vibrations of the vehicle. A suitable opening 82 is provided in the bulkhead 80 and the rubber sheet 81 to accommodate the adjusting screw 62.

In operation, with the inertia switch 50 connected in the circuit of FIG. 2 as schematically represented by the inertia switch 21, the members 54 and 55 are normally held in an upright or substantially upright position by the springs 59 and 60. However, when the vehicle is decelerated the mass of the inertia member 54 carries the member 55 forward against the resisting force of the spring 59 until the contact 70 engages the contact 64. The engagement of contacts 64 and 70 closes the series circuit which includes the lamp 15 which is energized to illuminate the reflector 16 and display a warning signal to the driver of a vehicle which may be following the vehicle 10.

The contacts 70 and 64 are maintained in engagement so long as the vehicle 10 decelerates at a rate such that the inertia force of the member 54 overcomes the resisting force of the spring 59. However, when the force exerted by the spring becomes greater than that exerted by the member 54 due to the termination of or reduction in the rate of decrease of speed, the members 54 and 55 are returned toward the center position by the spring 59 to open the contacts 64 and 70 and open the circuit to the lamp.

The dashpot 72 serves to dissipate the energy of the spring 59 so as to prevent excessive oscillations of the members 54 and 55, particularly when the vehicle is decelerated very suddenly.

In the arrangement of FIG. 3 two inertia switches such as the switch 50 may be employed to energize the lamp 29 or the lamp 30 as the vehicle is accelerated or decelerated.

The arrangement of the inertia switch of FIGS. 4 and 5 is particularly advantageous in practice of the present invention. This is so since it will be realized that relatively small accelerating and decelerating forces may be involved in the ordinary operation of an automobile. By the use of a pivoted member, e.g., the member 55 for carrying the inertia member, e.g., the member 54 has a relatively wide range of design parameters, e.g., as to the mass of the member 54 the stiffness and location of the springs 59 and 60, the location of the contact 70 and the location and resistance of the dash-pot 72 so that virtually any desired degree of sensitivity or insensitivity of the switch may be obtained. It is to be understood, of course, that the usefulness of the inertia switch 50 is not limited to the practice of the present invention.

Referring now to FIG. 6, there is shown an inertia switch 85 which is particularly adapted to be utilized in the embodiment of the invention of FIG. 3. The switch incorporates an inertia member 86, a pivot member 87, springs 88 and 89 and adjusting screws 90 and 91, and a fixed contact and movable contacts 92 and 93 in the same manner as the corresponding members of the switch 50. The switch 85, however, incorporates a second fixed contact 94 and terminal 95 and movable contact 96 opposed to the contacts 92 and 93. With this arrangement and the switch 85 mounted on the forward side of the bulk-head 97, contacts 92 and 93 close when the vehicle is decelerated while contacts 94 and 96 close when the vehicle is accelerated. Thus the single switch 85 may be substituted for the two switches 37 and 43 with the contacts 92 and 93 corresponding to the contact 36 and the contacts 94 and 96 corresponding to the contact 41.

Referring now to FIG. 7, there is shown an alternative inertia switch which differs somewhat from the inertia switches of FIGS. 4 to 6, inclusive. The switch 100 of FIG. 7 comprises a housing 101 which includes a base member 102 and a cover 103. The switch is adapted to be mounted horizontally and includes flanges 104 and 105 for securing the switch to a rigid part of the frame or body of the automobile.

The switch 100 incorporates a spherical ball 106 which slides along a flat plate 107 and comprises an inertia member corresponding to the member 54 of FIGS. 4 and 5. The ball 106 is held by a system of springs including two inner springs 108 and 109 and two outer springs 110 and 111. The springs 108 and 110 are separated by an insulating washer 112 which carries a movable contact 113 while the springs 109 and 111 are separated by an insulating washer 114 which carries a contact 115. The springs 110 and 111 bear upon two insulating bushings 116 and 117 which support two contacts 118 and 119. The contacts 113 and 115 are connected to the springs 110 and 111, respectively, by short leads, and the springs are in turn connected to the housing. The springs 110 and 111 are, of course, insulated from the screws which carry contacts 118 and 119 by the bushings 116 and 117.

In operation the ball 106 is normally held in the center of the housing with the contacts in a normally open condition. When the automobile decelerates, however, the ball tends to move toward one end of the housing and urges the associated movable contact, for example the contact 113, into engagement with its associated contact 118. This closes the series circuit to the indicator lamp and energizes the lamp to warn a following driver. The movement of the ball is, of course, in the opposite direction for an opposing acceleration.

The plate 107 may be suitably selected to give the desired co-efficient of friction with the ball 106 and particularly to dissipate oscillation of the system. For example, the plate 107 may be glass which is coated with a suspension of carbon or other friction material in a suitable carrier, in layers of increasing thickness from the center position so as to provide increasing frictional forces as the ball moves away from the center position.

The arrangement shown, in which contacts 113 and 115 are carried between the separate springs 108 and 110 and 109 and 114, respectively, is such that the closing of the respective pairs of contacts takes place throughout a definite and controllable interval during the displacement of the ball 106 under influence of accelerating or decelerating movement of the switch 100. Thus, the spring 111 may be soft as compared with spring 109, so that the closure of the contacts 115 and 119 takes place relatively soon during the displacement of the ball 106 to the right, while at the same time the separation of the contacts is delayed by the frictional effect between the plate 107 and the ball 106.

It is to be understood that the foregoing description is not intended to restrict the scope of the invention and that various rearrangements of the parts and modifications of the design may be resorted to. The following claims are directed to combinations of elements which embody the invention or inventions of this application.

I claim:

1. An acceleration switch comprising a housing, an inertia member in the housing and a rigid member carrying the inertia member at one end thereof, a pivot at the remaining end of the rigid member fixed to the housing, spring means at each side of the rigid member and supported at the outer ends thereof by the housing for normally holding the rigid member and the inertia member in a neutral position, a movable contact on the rigid member, a fixed contact and insulating means supporting the fixed contact from the housing whereby the movable contact is carried into engagement with the fixed contact to close an external circuit when the housing is subjected to accelerative and decelerative forces, and a one-way pneumatic dashpot connected from the rigid member to the housing on the side of the rigid member away from the fixed contact for dissipating the energy of the inertia member and the spring means tending to cause oscillation of the rigid member when the accelerative or decelerative forces are terminated.

2. An acceleration switch comprising a rigid support means, a movable means carried by the support means including an inertia member and a movable contact, a fixed contact adapted to be contacted by the movable contact when the movable means is carried toward the fixed contact by the inertia member, a terminal for the fixed contact and a terminal for the movable contact for connecting the contacts to an external circuit for modifying the condition of that circuit according to the movement of the inertia member relative to the support means, spring means disposed between the movable means and the support means for normally holding the movable means in neutral position and permitting the movable means to become displaced by the inertia member and for restoring the movable means to neutral position when the forces affecting the movement of the inertia member toward the fixed member are terminated, and means for dissipating the restoring forces exerted by the spring means when the said last named forces are terminated.

3. An acceleration switch comprising a housing, an inertia member in the housing and a rigid member carrying the inertia member at one end thereof, a pivot at the remaining end of the rigid member fixed to the housing, spring means at each side of the rigid member supported by the housing for normally holding the rigid member and the inertia member in a neutral position, a movable contact on the rigid member, a fixed contact supported by the housing, insulating means for at least one of the said contacts and means for connecting said contacts to an external circuit for modifying the condition of that circuit when the housing is subjected to accelerative and decelerative forces and a one-way dashpot connected from the rigid member to the housing to permit substantially free displacement of the rigid member toward the fixed contact and resisting movement of the rigid member away from the fixed contact.

4. An acceleration switch comprising a housing, an inertia member in the housing and a rigid member carrying the inertia member at one end thereof, a pivot at the remaining end of the rigid member fixed to the housing, spring means at each side of the rigid member supported by the housing for normally holding the rigid member and the inertia member in a neutral position and for restoring the movable means to the neutral position, a movable contact on the rigid member, a fixed contact supported by the housing, insulating means for at least one of the said contacts and means for connecting said contacts to an external circuit for modifying the condition of that circuit when the housing is subject to accelerative and decelerative forces, and means for dissipating the restoring forces exerted by the spring means tending to return the movable means to the neutral position.

5. The invention in accordance with claim 2 in which the last named means comprises a dashpot operatively connected between the movable means and the rigid support means for permitting substantially free displacement of the movable means toward the fixed contact and subsequently resisting movement of the movable means away from the fixed contact.

6. In an inertia device, a housing, an inertia member, means movably supporting the inertia member in the housing for displacement thereof when the housing is subjected to accelerating or decelerating movement, spring means arranged between the inertia member and the housing for normally maintaining the inertia member in a neutral position, and a one-way fluid dashpot means effective between the inertia member and the housing for dissipating the energy of the spring means during return movement of the inertia member to the neutral position after movement of the housing tending to displace the inertia member from the neutral position to prevent oscillating movement of the inertia member without substantial diminution of forces tending to displace the inertia member from the neutral position.

7. In an inertia device for providing an indication of acceleration or deceleration, a housing, an inertia member movably carried by the housing for displacement thereof from a neutral position when the housing is subjected to accelerating or decelerating movement, spring means effective between the inertia member and the housing for normally maintaining the inertia member in the neutral position and for restoring the inertia member to the neutral position after displacement thereof by the said movement, and means effective between the inertia member and the housing having substantially no resistance to displacement of the inertia member away from the neutral position and for dissipating the energy of restoring forces during return of the inertia member to the neutral position after the said movement is terminated.

8. The invention in accordance with claim 7 in which the last named means comprising one way fluid dashpot means for dissipating the energy of forces exerted by the spring means tending to restore the inertia member to the neutral position without substantially dissipating the forces tending to produce movement away from the neutral position due to the accelerating or decelerating movement.

9. The invention in accordance with claim 8 in which the said one way dashpot means utilizes a gaseous medium.

10. An inertia device comprising a rigid support means, a movable means carried by the support means including an inertia member arranged for displacement thereof from a neutral position when the support means is subjected to accelerating or decelerating movement, spring means effective between the inertia member and the support means for normally maintaining the inertia member in the neutral position and for restoring the inertia member to the neutral position after displacement thereof by the said movement, and means effective between the support means and the inertia member having substantially no resistance to displacement of the inertia member away from the neutral position and for dissipating restoring forces during return of the inertia member to the neutral position after relative movement of the support means displacing the inertia member from the neutral position.

References Cited in the file of this patent

UNITED STATES PATENTS

| | | |
|---|---|---|
| 1,626,921 | Douglas | May 3, 1927 |
| 2,907,607 | Williams | Oct. 6, 1959 |
| 2,913,072 | Williams | Nov. 17, 1959 |